United States Patent [19]

Mazumder

[11] Patent Number: 5,121,437
[45] Date of Patent: Jun. 9, 1992

[54] MICR CHARACTER READER INDEPENDENT OF DOCUMENT TRANSPORT SPEED

[75] Inventor: Ali T. Mazumder, Waterloo, Canada
[73] Assignee: NCR Corporation, Dayton, Ohio
[21] Appl. No.: 136,069
[22] Filed: Dec. 21, 1987
[51] Int. Cl.⁵ .............................................. G06K 9/00
[52] U.S. Cl. .............................................. 382/7; 382/12
[58] Field of Search ................ 382/7, 12; 235/474; 307/234

[56] References Cited

U.S. PATENT DOCUMENTS

| | | |
|---|---|---|
| 3,092,809 | 6/1963 | Merritt et al. ........................... 382/7 |
| 3,096,506 | 7/1963 | Chow et al. ............................ 382/7 |
| 3,272,969 | 9/1966 | Cutala .................................. 235/449 |
| 3,278,900 | 10/1966 | Wood ...................................... 382/7 |
| 3,316,536 | 4/1967 | Andrews et al. ...................... 382/7 |
| 3,528,058 | 9/1970 | Bond ...................................... 382/7 |
| 3,629,829 | 12/1971 | Ordower ............................... 382/7 |
| 3,800,234 | 3/1974 | Myren ................................. 307/234 |
| 3,932,839 | 1/1976 | Stepmens ............................. 382/6 |
| 4,114,031 | 9/1978 | Busuman et al. ................... 235/474 |
| 4,143,355 | 3/1979 | MacIntyre ............................ 382/7 |
| 4,148,010 | 4/1979 | Shiau .................................... 382/7 |
| 4,182,481 | 1/1980 | Maussion ........................... 235/449 |
| 4,194,144 | 3/1980 | Reynolds ........................... 318/341 |
| 4,245,211 | 1/1981 | Kao ....................................... 382/7 |

Primary Examiner—David K. Moore
Assistant Examiner—Yon Jung
Attorney, Agent, or Firm—Elmer Wargo

[57] ABSTRACT

A method and apparatus for recognizing MICR characters having positive peak values, negative peak values, and substantially zero values occurring at predetermined clock positions along the associated waveform. A first count derived from the speed of the MICR characters moving past the associated reader is used for deriving nominal clock pulses for clocking the peak and zero values into storage registers associated with the apparatus. The occurrences of positive and negative peak values are used to adjust the first count depending upon whether the MICR characters are moving faster or slower than a nominal rate, with the adjustment being used to provide an adjusted count which is used for determining subsequent clock pulses.

5 Claims, 8 Drawing Sheets

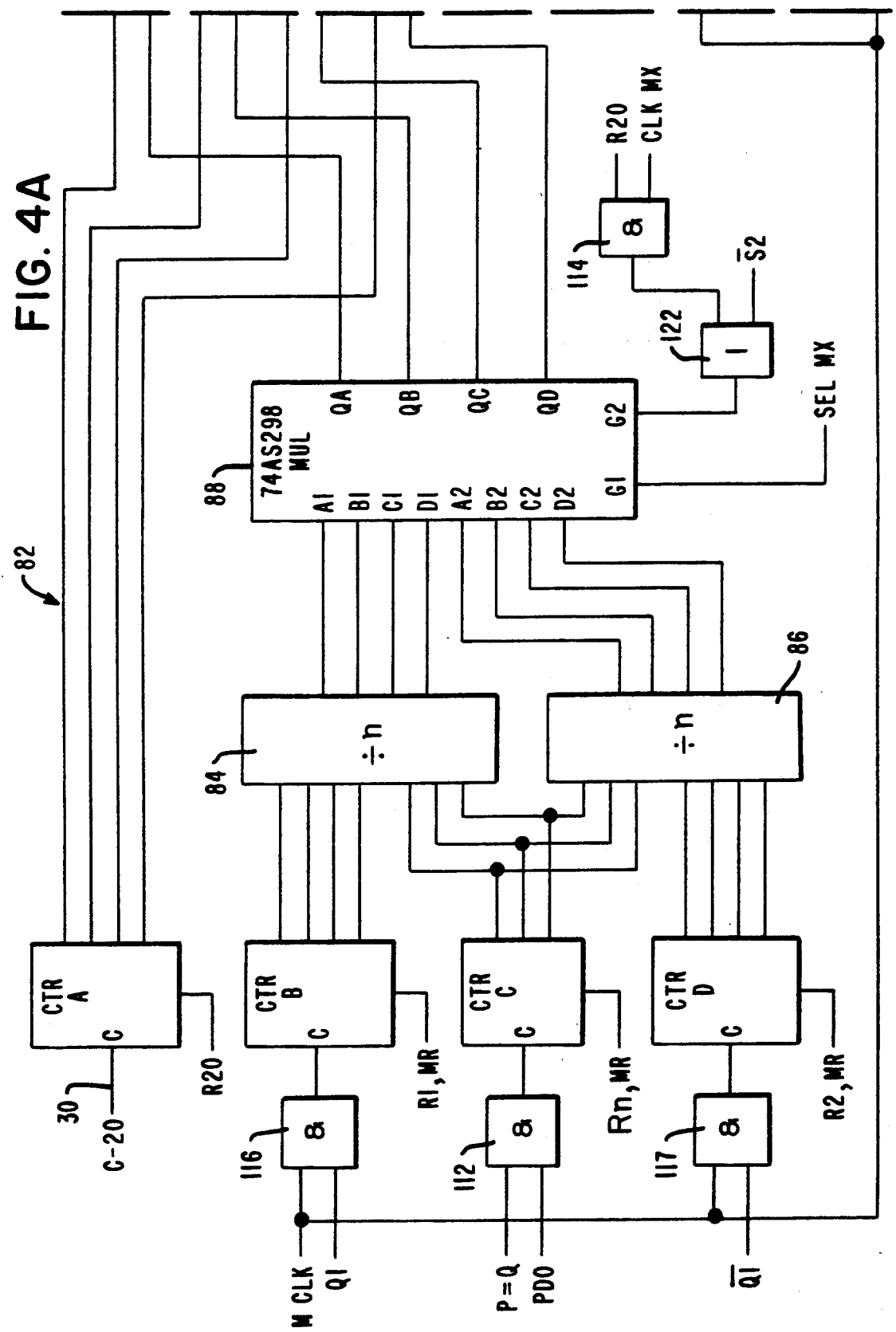

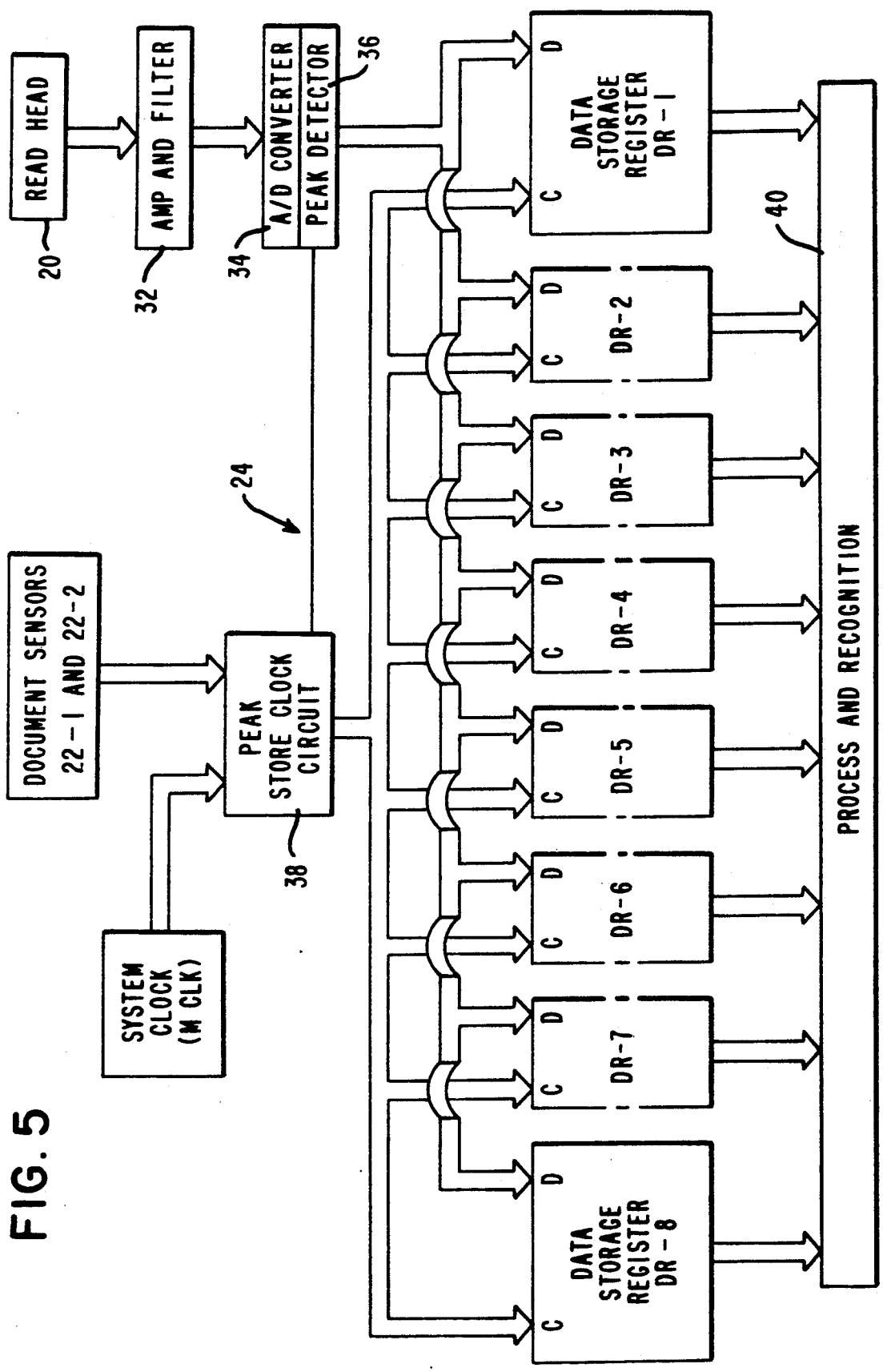

MICR CHARACTER READER INDEPENDENT OF DOCUMENT TRANSPORT SPEED

BACKGROUND OF THE INVENTION

This invention relates to an apparatus for reading magnetic character waveforms, like E13B, which are imprinted on documents, like checks, even though there is a variation in the speed of the document as it is moved through the apparatus.

In some prior art MICR (Magnetic Ink Character Recognition) readers, it is common to use an expensive, constant velocity motor to move the document at a constant velocity past the associated read head within the apparatus. With a constant speed, the anticipated positive magnetic peaks, negative peaks, and lack of peaks appear within the designated "windows" for the character being read, providing an accurate reading of the character. When the speed of the document changes for various reasons, the magnetic peaks read may not fall within the anticipated windows or time slots, causing the character to be rejected.

Another prior art technique of adjusting to variations in the speed of the document as it passes the associated read head is to adjust the width of the examining "window" to enable an anticipated magnetic peak to fall within the anticipated window.

SUMMARY OF THE INVENTION

The purpose of this invention is to develop a reader which is able to read MICR data on a document with no knowledge of the document speed even though there is a variation in the speed of the document as it is moved past the reader.

In a preferred embodiment of this invention, there is included a character recognition circuit for recognizing MICR characters which have waveforms in which positive peak values, negative peak values, and substantially zero values occur at predetermined clock positions along a said waveform to provide a means for identifying a character; said waveforms always starting with a starting positive peak value; said circuit comprising: means for generating said waveforms during a character reading process by moving a document with said MICR characters thereon in reading relationship with a MICR reader; means for converting a said waveform into said positive peak values, negative peak values, and substantially zero values and for placing these values on data lines; data register means for storing said positive, negative and substantially zero values when clocked therein, a clocking circuit for clocking said positive, negative, and substantially zero values into said data register means to take into account the speed at which the document on which the MICR characters are located is moving in reading relationship with said MICR reader; said clocking circuit comprising: first means for determining a nominal clock period represented by a first count; second means for using said first count after said starting peak value has occurred to establish nominal clocking pulses in the absence of a said positive or negative peak value for use in clocking the values on said data lines into said data register means; and third means for adjusting said first count in accordance with the occurrence of a first one of said positive or negative peaks reached to provide an adjusted count whereby said second means uses said adjusted count for establishing the next clocking pulse for use in clocking a said value on said data lines into said data register means and whereby said third means adjusts said adjusted count, if necessary, upon the occurrences of subsequent said positive and negative peak values.

In another aspect, this invention relates to a method of recognizing MICR characters which have waveforms in which positive peak values, negative magnetic peak values, and substantially zero values occur at predetermined clock positions along a said waveform to provide a means for identifying a character; said waveforms always starting with a starting positive peak value; said method comprising the steps of: (a) generating said waveforms during a character reading process by moving a document with said MICR characters thereon in reading relationship with a MICR reader; (b) converting a said waveform into said positive peak values, negative peak values, and substantially zero values and for placing these values on data lines; (c) storing said positive, negative and substantially zero values in data registers when clocked therein, (d) clocking said positive, negative, and substantially zero values into said data registers while taking into account the speed at which the document on which the MICR characters are located is moving in reading relationship with said MICR reader; said clocking step (d) comprising the steps of: (e) determining a nominal clock period represented by a first count; (f) using said first count after said starting peak value has occurred to establish nominal clocking pulses in the absence of a said positive or negative peak value for use in clocking the values on said data lines into said data registers; and (g) adjusting said first count in accordance with the occurrence of a first one of said positive or negative peaks reached to provide an adjusted count; (h) using said adjusted count for establishing the next clocking pulse for use in clocking a said value on said data lines into said data register means; (i) adjusting said adjusted count, if necessary, upon the occurrences of subsequent said positive and negative peak values; and (j) repeating said using step (g) and said adjusting step (h) until clocking pulses for said predetermined clock positions have been generated.

BRIEF DESCRIPTION OF THE DRAWING

FIGS. 4A and 4B, taken together, show a portion of the read circuit shown in FIG. 1;

FIG. 5 is a general schematic overall view of the read circuit shown in FIG. 1;

DETAILED DESCRIPTION OF THE INVENTION

Figure 1:
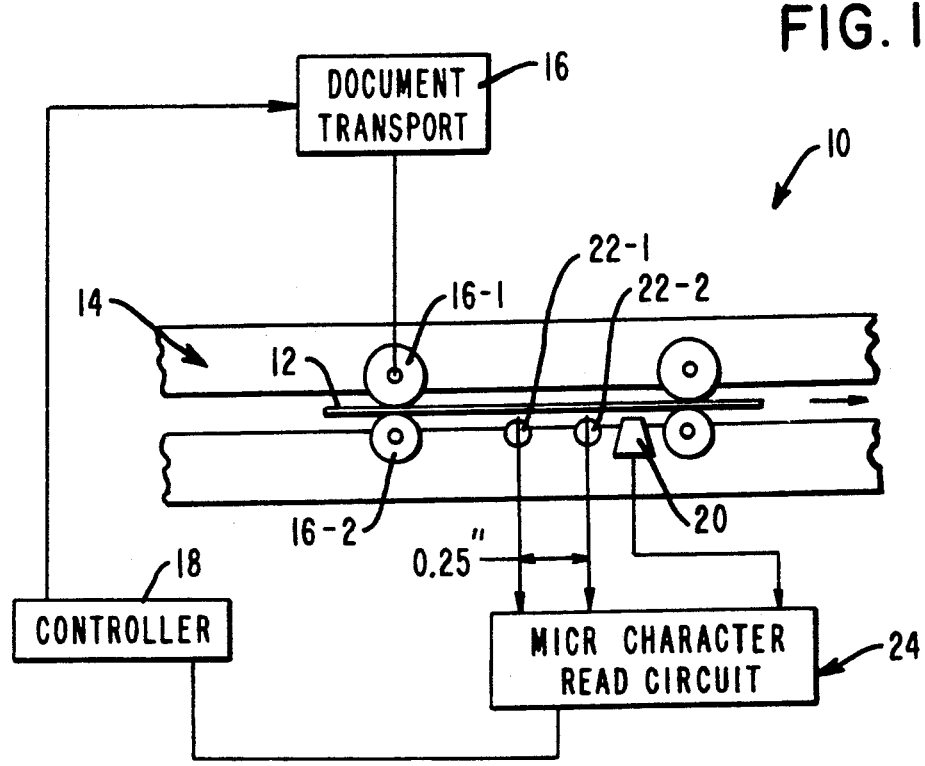
FIG. 1 is a general schematic plan view of the apparatus of this invention.

As stated earlier herein, one of the purposes of this invention is to read MICR data on a document even though there is some variation in the speed of the document as it is moved past the associated read head. In this regard, FIG. 1 shows a typical environment in which this invention may be used. In the banking or financial systems, certain data is printed on documents in magnetic ink; this data is referred to as MICR data, and it generally appears near the bottom of the documents, like checks, for example.

When the MICR data is to be read, the document 12, carrying the data, is moved in a document track 14 by a document transport 16 which includes rollers 16-1 and 16-2, with the document transport 16 being under the control of a controller 18. As shown in FIG. 1, the top edge of the document is visible, with the bottom edge of the document 12 gliding over the bottom of the document track 14. A read head 20 is positioned in the track 14 so as to be in reading relationship with the magnetized MICR data on the document 12 as it is moved thereby.

Prior to the document 12 reaching the read head 20, its leading edge encounters a first sensor 22-1, and thereafter, the leading edge encounters a second sensor 22-2 (FIG. 1). The sensors 22-1 and 22-2 are spaced apart a predetermined distance, and they are used as part of a means for determining the velocity of the document 12; this aspect will be described in more detail hereinafter. The outputs of the sensors 22-1 and 22-2 are coupled to a MICR character read circuit which is designated generally as circuit 24; this circuit 24 is part of the apparatus 10.

Before describing the apparatus 10 in more detail, it appears appropriate to discuss the characteristics of the waveforms generated when the MICR data is moved in operative relationship with the read head 20. In the embodiment described, the waveforms to be discussed are associated with E13B font or characters, although the principles of the invention may be extended to the reading of magnetic waveforms other than the E13B mentioned.

Figure 2:
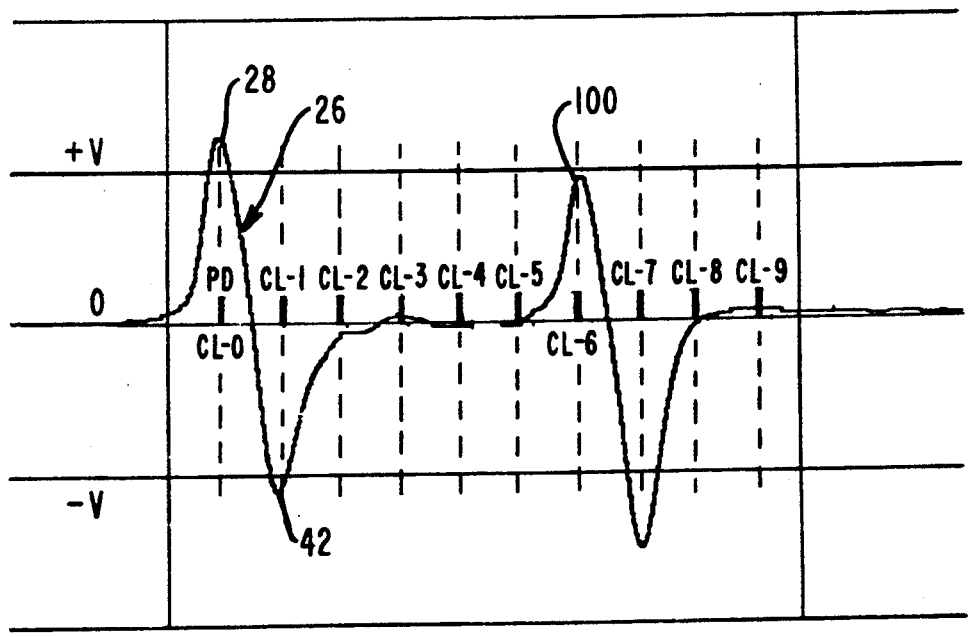
FIG. 2 is a waveform of a MICR character in E13B font using an inductive type read head, which character is read by the apparatus of this invention.

Some of the characteristics of E13B characters are as follows. The character pitch according to ABA standards is 0.125 inch; that is, it is 0.125 inch from the start of one character to the start of the next character. Within this 0.125 inch, there are eight cells or equally-spaced windows which are used to examine the magnetic waveform for an associated character. In this regard, a magnetic waveform may have positive peaks, negative peaks, and no peaks or substantially zero values which are located in the cells in predetermined patterns so as to be indicative of a particular character within the system. Another point is that each character always starts with a positive-going peak in the first cell or window. FIG. 2 shows a magnetic waveform 26 for the number zero. Notice that the character starts with a positive going peak 28.

Whenever there is relative motion between the magnetized MICR characters on the document 12 and the read head 20, a voltage which is proportional to the rate of change of magnetic flux is generated. For the correct MICR recognition of a character, it is necessary that peaks within the waveform be identified and located properly. Whenever the speed of the document varies, the peaks in the associated waveform which is developed may not fall within the proper windows or cells of the waveform; consequently an error in reading may result. The present invention provides a unique way of recognizing MICR characters by which instantaneous changes in the speed of the document moving past the read head 20 will have no effect on reading characters accurately.

Figure 3A:
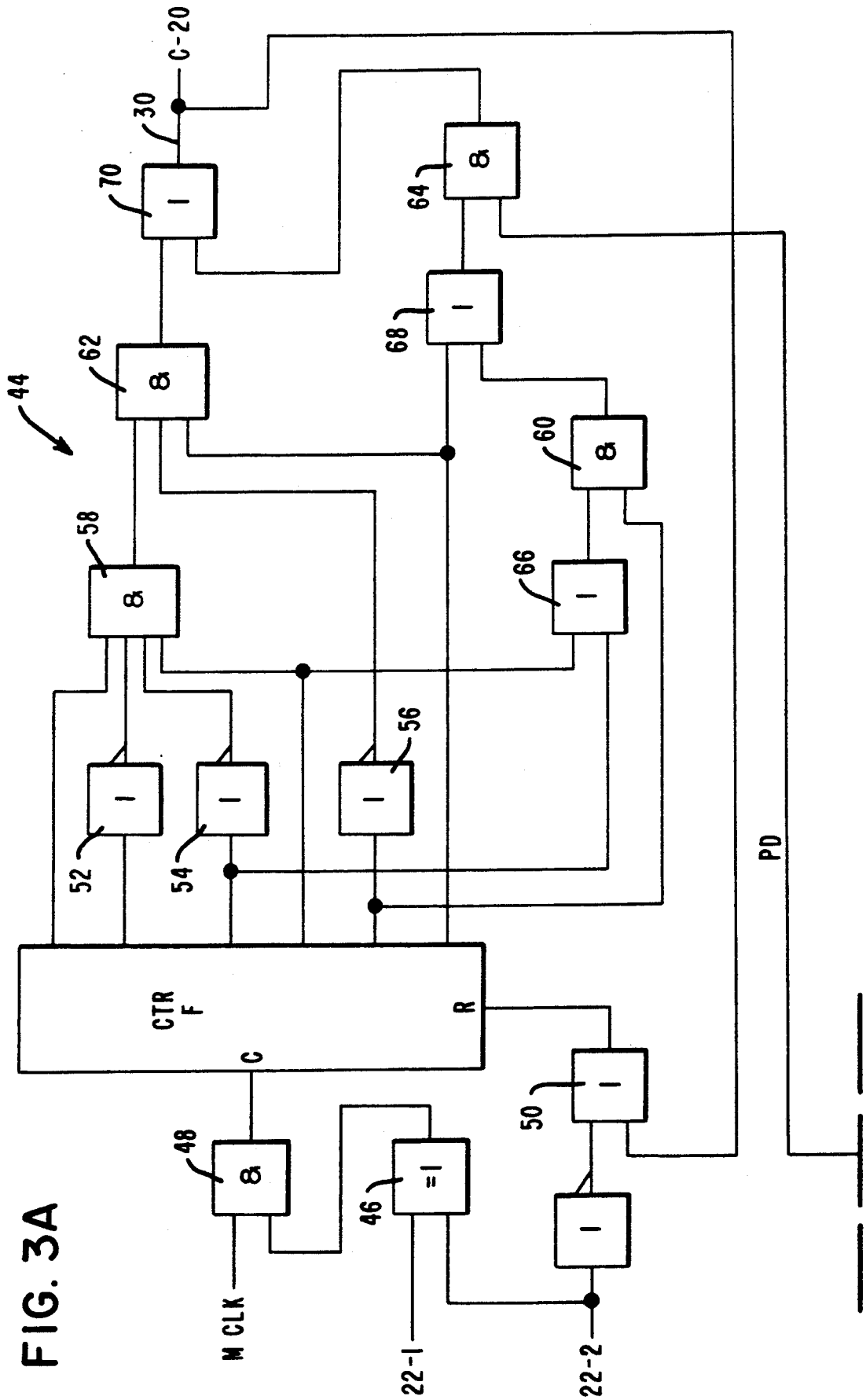
FIGS. 3A and 3B, taken together, show a portion of the read circuit shown in FIG. 1.

FIG. 2 also illustrates certain factors associated with this invention. As stated earlier herein, this figure shows the magnetic waveform of the number 0. There are ten clock pulses generated for a character pitch which is 0.125 inch; these ten pulses are marked as CL-0 through CL-9. The first clock pulse starts with the generation of the first positive peak 28; this first clock is marked CL-0. In the embodiment described, the sensors 22-1 and 22-2 are spaced apart a distance of 0.25 inch to cooperate with certain counters in the circuit 24 to establish a count which is indicative of the speed of the document 12 as it passes the read head 20. In this regard, counter F in FIG. 3A is used to record the number of counts which it takes for the leading edge of the document 12 to travel from sensor 22-1 to sensor 22-2. Counter F counts up to twenty, and produces a signal C-20 on conductor or line 30 for each count of twenty. The signal C-20 is fed into the counter A in FIG. 4A. In other words, counter A receives a count for every 20 counts on counter F, and thus, counter A acts as a "divide by 20" counter. Each count of counter A thus represents a nominal distance of 0.0125 inch of document travel which is obtained by dividing the distance between sensors 22-1 and 22-2 (0.250 inch) by 20 After detecting the first positive peak 28 (FIG. 2), a clock pulse is developed every 0.0125 inch of document travel to represent the next peak position (if any); however, if an actual peak is detected, the clock frequency is adjusted accordingly to match the peak frequency. Thus, the system follows the motion or speed of the MICR characters rather than the speed of the document. This aspect will become clearer after a discussion of the read circuit 24.

The read circuit 24 is shown in more detail in FIG. 5. The output of the read head 20 is amplified and filtered in circuit 32, and the output of circuit 32 is fed into an A/D converter 34 which produces a binary output which is clocked into one of the data storage registers DR-1 through DR-8 as will be described hereinafter. The A/D converter 34 also has a peak detector 36 associated with it. The output of the peak detector 36 is fed into a peak store clock circuit 38 which also receives the system clock (M clock). In general, the peak store circuit 38 is used to clock data coming from the A/D converter into the data storage registers DR1 through DR-8.

The data storage registers DR-1 through DR-8 contain data which is used for character recognition by conventional process and recognition circuitry 40. Notice from FIG. 2 that the first positive-going peak is peak 28; this peak is used to clock the value of the peak into the storage register DR-1. The first positive-going peak is also considered clock CL-0. In the example from FIG. 2, the next peak 42 is a negative-going peak 42 which becomes clock CL-1 for clocking data into the storage register DR-2; again, this would be the value of the peak 42 which is obtained from the A/D converter 34. Clock CL-2 in FIG. 2 is used to clock data into storage register DR-3, and correspondingly, clock CL-7 is used to clock data into the storage register DR-8. Clocks 8 and 9 occur at or near the zero value of the waveform 26 and do not contain data which is indicative of a particular character. In other words, clocks CL-0 through CL-7 provide the eight clocks for data which is meaningful in identifying a character. The process and recognition circuitry 40 is conventional, and it may be a separate circuit, or it may be part of the controller 18. In general, the positive peak values, the negative peak values, and and the lack of peaks or no peaks which are stored in the storage registers DR-1 through DR-8 at the various clock positions are used to identify particular characters in the E13B font.

Figure 3B:
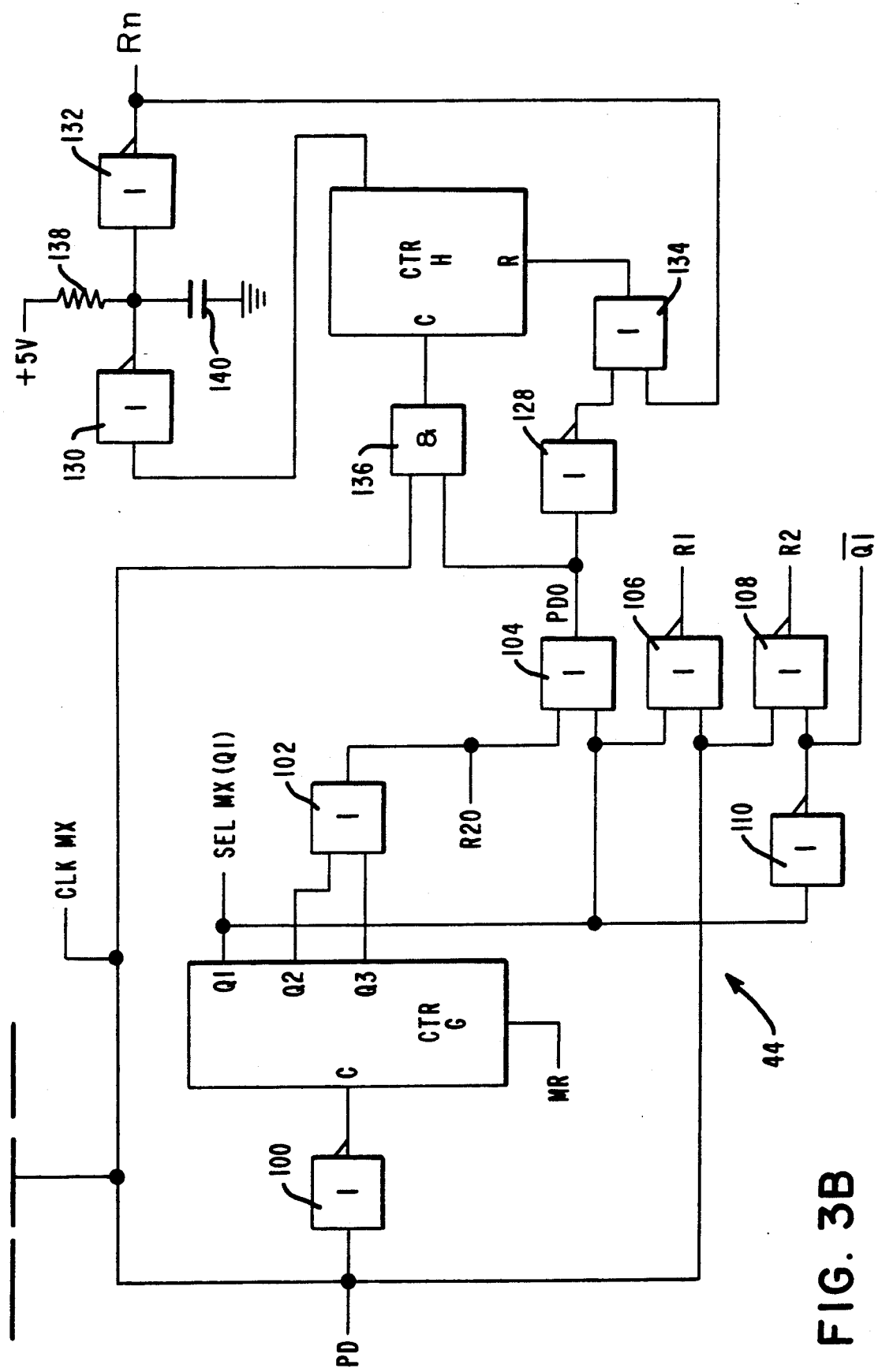

The peak store clock circuit 38 (FIG. 5) includes the circuit portion 44 shown in FIGS. 3A and 3B. The circuit portion 44 includes the counter F, alluded to earlier herein, with counter F being wired in the circuit portion 44 to count up to 20 repeatedly. In this regard, the counter F starts to count when a positive-going signal from sensor 22-1 passes through an Exclusive Or gate 46, indicating that the leading edge of a document 12 has reached this sensor. A positive output from the Ex Or gate 46 conditions the And gate 48, permitting the M clock pulses to reach the counter F to start the counting process. In the embodiment described, the M clock has a frequency of 144 KHz, although other frequencies could be used for different applications. The counter F is reset upon reaching a count of 20, in the application being described, by the C-20 signal passing through the Or gate 50. When the leading edge of the document to be read reaches the second sensor 22-2, a positive going output from this sensor is fed into the Ex Or gate 46; with two positive inputs to this gate 46, its output changes to a low level to stop the M clock from reaching the counter F.

The outputs of the counter F are conventionally wired to produce the C-20 signal on line 30 when a count of 20 is reached. The circuit portion 44 includes the inverters 52, 54, and 56, the And gates 58, 60, 62, and 64, and the Or gates 66, 68, and 70 which are wired as shown to produce the count of 20 from the counter F.

The counts of the C-20 signals are counted on the counter A in FIG. 4A during the time that the leading edge of the document is moving from sensor 22-1 to sensor 22-2. In effect, this count is a measure of the nominal velocity of the document 12 as it is being moved past the read head 20; typically, the count produced by counter F reaches about 200 for the embodiment described. It should be recalled that the sensors 22-1 and 22-2 (FIG. 1) are spaced apart a distance of 0.25 inch, and that each count on counter A represents a nominal document travel of 0.0125 inch. The nominal velocity of the document is obtained before the first MICR character to be read is encountered by the read head 20.

Figure 6:
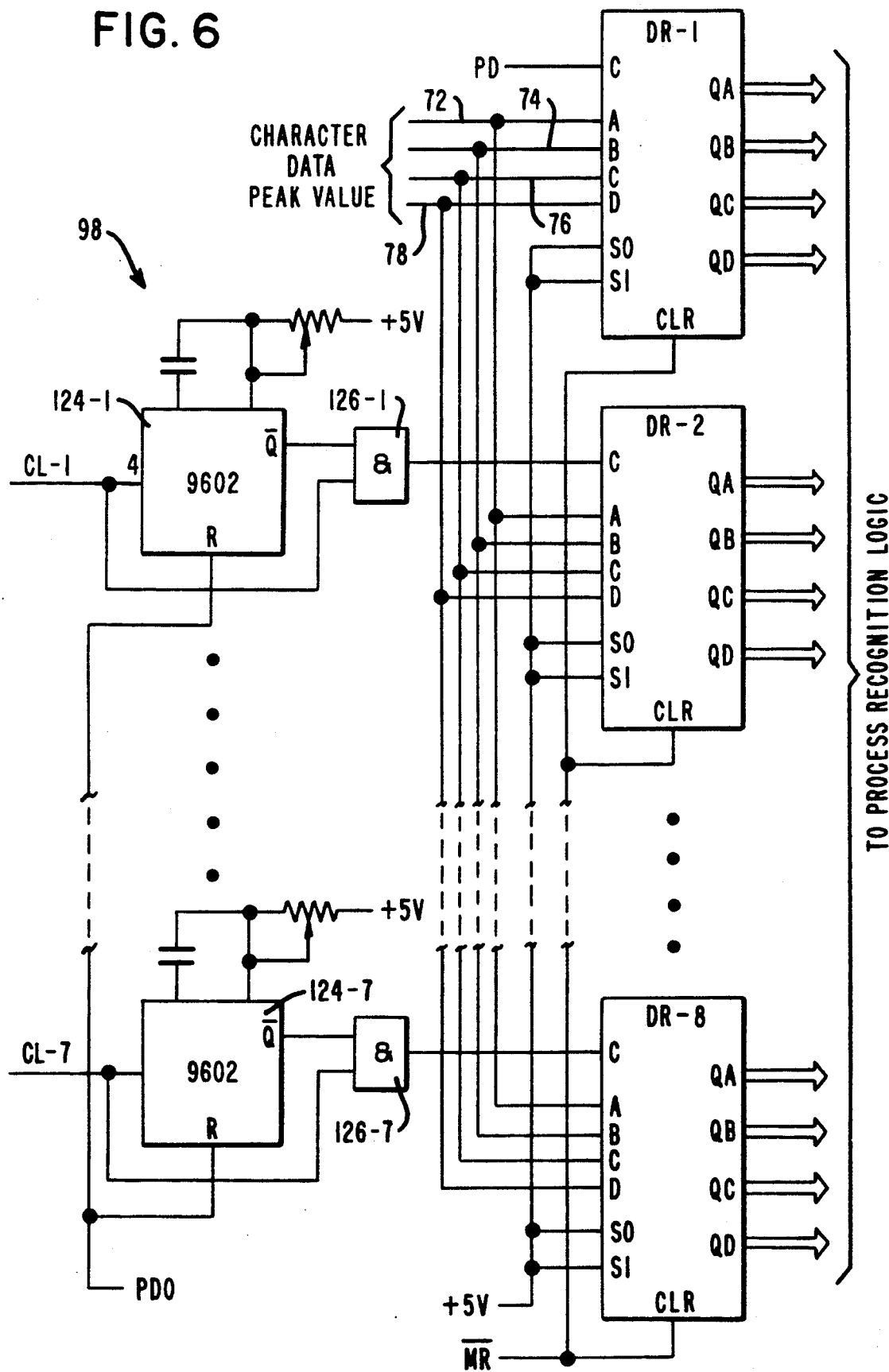
FIG. 6 is a general schematic diagram of a portion of the circuit shown in FIG. 5.

When the first portion of MICR data is encountered by the document 12 moving in operative relationship with the read head 20, a first positive-going pulse is encountered which is indicative of the E13B font being discussed. The first positive peak 28 (FIG. 2) is used to perform a couple of functions. The pulse 28 is used to clock the voltage value of the pulse into the data storage register DR-1 shown in FIG. 6. There are four lines 72, 74, 76, and 78 which are used to provide the character data peak value to all of the storage registers DR-1 through DR-8; however, the data is clocked into a specific register by an associated clock. As just stated, the first positive pulse 28 is used to clock the character data peak value into the data storage register DR-1, the clock CL-1 is used to clock the character data peak value into the data storage register DR-2, and finally, the clock CL-7 is used to clock the character data peak value into the data storage register DR-8. The registers DR-1 through DR-8 are shown as four bit registers; however, in the embodiment described, the registers are eight bit registers to provide for higher resolution, and there are also duplicate or dual registers (not shown) to store data for the negative peaks, like peak 42 in FIG. 2.

Figure 4B:
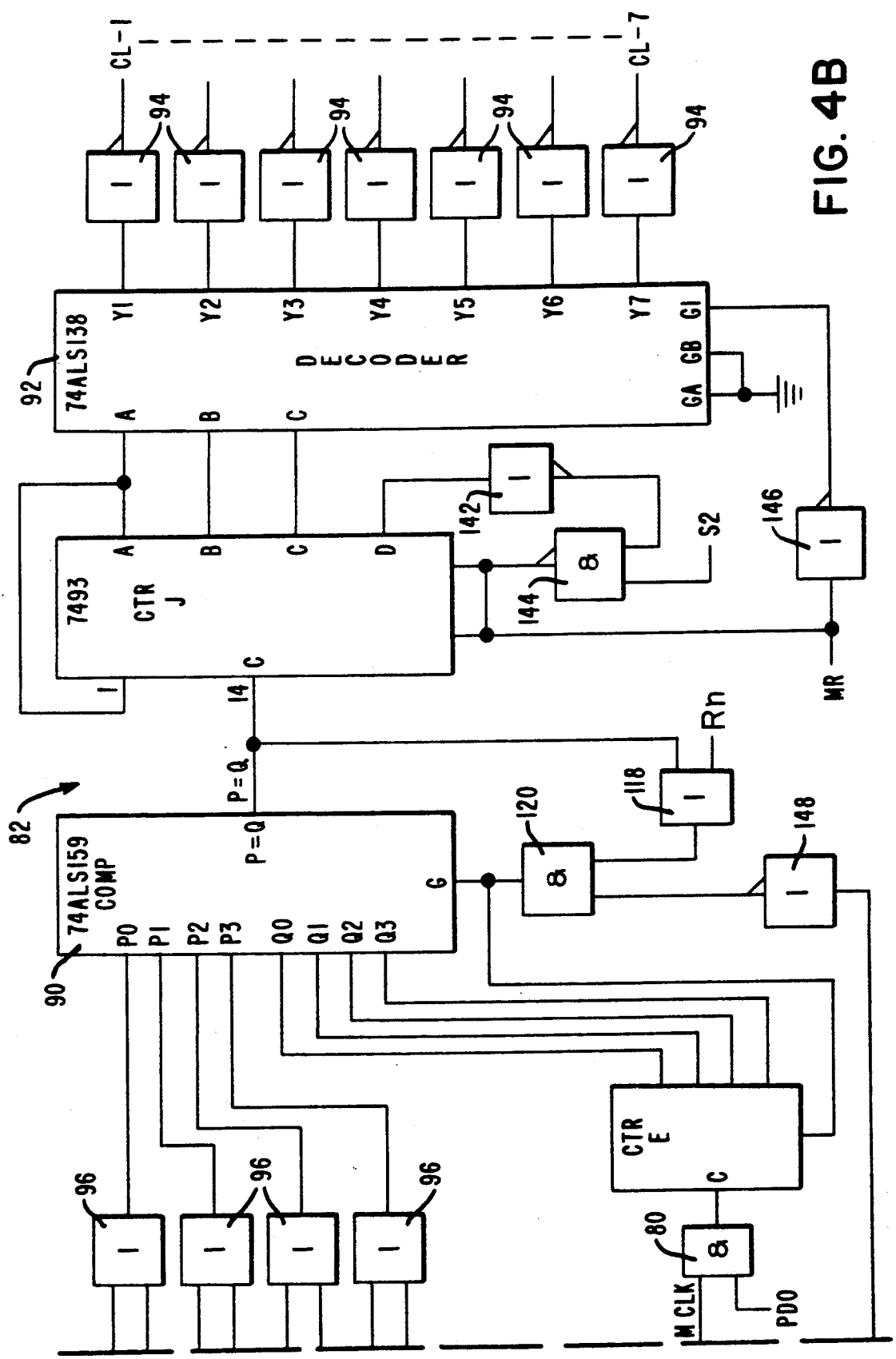

Another function of the first positive-going pulse 28 is to condition the counter E in FIG. 4B to provide a count which is indicative of a cell width when, for example, there are no positive or negative-going peaks for portions of the character being examined. For example, in FIG. 2, there are no peaks associated with the clocks CL-2 through CL-5; this is the waveform for the character zero. The first positive-going pulse 28 coming from the peak detector 36 (FIG. 5) is marked as PD in FIG. 3B. This PD pulse is fed into the counter G which is used to provide a plurality of control signals which will be described hereinafter. For the moment, it is sufficient to state that the PDO signal is one of those signals. This PDO signal remains at a high level after the first positive-going peak is obtained, and as shown in FIG. 4B, the PDO signal is fed through an And gate 80 to enable the counter E to count the pulses from the master clock (M CLK).

Continuing with a discussion of the counter G, it is useful to look at FIGS. 4A and 4B which together show a portion 82 of peak store clock circuit 38 shown in FIG. 5. As a general explanation, the circuit portion 82 provides a means for providing the various clocks CL-1 through CL-7 shown in FIG. 2. It should be recalled that the clocks CL-8 and CL-9 in FIG. 2 do not contain pertinent information and that the counter E is enabled only after the occurrence of the first positive peak 28 via the PDO signal. The circuit portion 82 also includes the counters B, C, and D, the "divide by" circuits 84 and 86, and the multiplexer 88. The circuit portion 82 also includes the comparator 90, the counter J, and the decoder 92 as major components.

The general operation of the circuit portion 82 shown in FIGS. 4A and 4B is as follows. The first count on the counter A that was used for the speed determination, is retained on the P0-P3 terminals of the comparator 90, and after the first positive peak 28, the counter E begins to accrue a count thereon. When the count on counter E equals the count on the comparator 90, it issues a P=Q signal. This P=Q signal represents the approximate location of the next peak in a waveform, like waveform 26, assuming that the particular character being read has a peak in that location. As an aside, some of the prior art character recognition schemes look for a peak within a cell or window; however, with the read circuit 24, the various clocks CL-1 through CL-7 are used as marking points as to where the peaks should be located. Continuing with the description, the counter J is used to count the number of times that a P=Q signal has been generated. A count of one on the counter J indicates that this is the first clock signal after the first positive peak was generated. A count of seven indicates that it is the seventh clock CL-7. The decoder 92 simply decodes the count on the counter J into the clock pulses CL-1 through CL-7. Inverters, like 94, are used to convert the low level outputs from the decoder 92 to high levels for the clocks CL-1 through CL-7.

Continuing with the description of FIGS. 4A and 4B, the counters B and C are used to accumulate a count from the last peak which occurs in the magnetic waveform, like 26 in FIG. 2. The counter B is used to accumulate the count to develop clocks between the peaks P2-P3, P4-P5, and P6-P7. With regard to FIG. 2, peak 42 is considered peak P1. Correspondingly, the counter D is used to accumulate the count to develop the clocks between the peaks P3-P4, P5-P6, and P7-P8. The counter C is used to accumulate the number of times the P=Q signal was generated for which no positive or negative-going peak was generated. As previously stated, the clocks, like CL-1, are used to look for an anticipated peak; however, if none is found, the clocking period at which the last peak was found is used to indicate the time interval to look for the next anticipated peak. In this regard, counter A is used only for the first starting positive peak (shown as 28 in FIG. 2 and shown as PD1 in FIG. 7), and thereafter, counters B and D are used for subsequent determinations after peaks PD2 and PD3 shown in FIG. 7 have occurred. As a general explanation, the counts which accumulate on the counter E are always used as a matching input for comparison with the counts which accrue on the counters B and D. Using the waveform 26 shown in FIG. 2 as as an example, from the clock CL-1 there was no peak found for clocks CL-2, CL-3, CL-4, and CL-5. Assume that the time period between clocks is represented by a count of ten on the counter B. Assume also, that the document 12 is travelling at a rate which is slower than normal so that instead of having a count of 40 on the counter B, the actual count thereon is 60. At the same time, the P=Q counts would be accumulating on the counter C; in this case, the count would be four because no peaks were found from clocks CL-1 through CL-5. Note also that when no peak is found, the accumulated count from the last peak is fed through the multiplexer 88 (FIG. 4A) to the comparator 90 (FIG. 4B). As soon as the increasing count on counter E (FIG. 4B) equals the count on the comparator 90, a P=Q signal is generated.

Continuing with the example being described in the previous paragraph, the count of 60 which accrued on the counter B is divided by the count of four which accrued on the counter C by the divide-by circuit 84 shown in FIG. 4A to produce a count of 15. The output of the divide- by circuit 84 is fed through the multiplexer 88 and through the Or gates 96 to the comparator 90. In the example being described, this means that the next clock, namely CL-6, will be delayed somewhat, due to the document 12 moving somewhat slower than normal. The delay is reflected by the fact that the count on the counter E must reach 15 instead of the usual 10, in the example being described, before there is a match in the comparator 90, and a P=Q signal issues therefrom. The P=Q signal is added to counter J in FIG. 4B, and this added count is used to obtain clock CL-6 from the decoder 92 in the example being described. The clock CL-6 is fed to the circuit portion 98 shown in FIG. 6 where this clock is used to clock the data on the lines 72, 74, 76, and 78 into the register associated with clock CL-6 which is register DR-7 (not shown on FIG. 6, but similar to register DR-8). In other words, the clocking pulse, like CL-6, is used to mark the point where another peak should be located. Another point to be made here is that whenever an actual peak, like peak 100 in FIG. 2, is detected by the peak detector 36, that point is used as the reference point from which the next time period starts.

It should be recalled from what had been discussed earlier herein, that the data which appears on the data storage registers DR-1 through DR-8 contains the positive peaks, the negative peaks, and the lack of peaks for the eight windows which are indicative of a character in the E13B font. After the eighth clock CL-7 is generated, the circuit 24 is reset to repeat the operation described for the next character. The data which appears on the storage registers DR-1 through DR-8 is routed to the character recognition circuitry 40 which identifies the associated character, conventionally.

Figure 7:
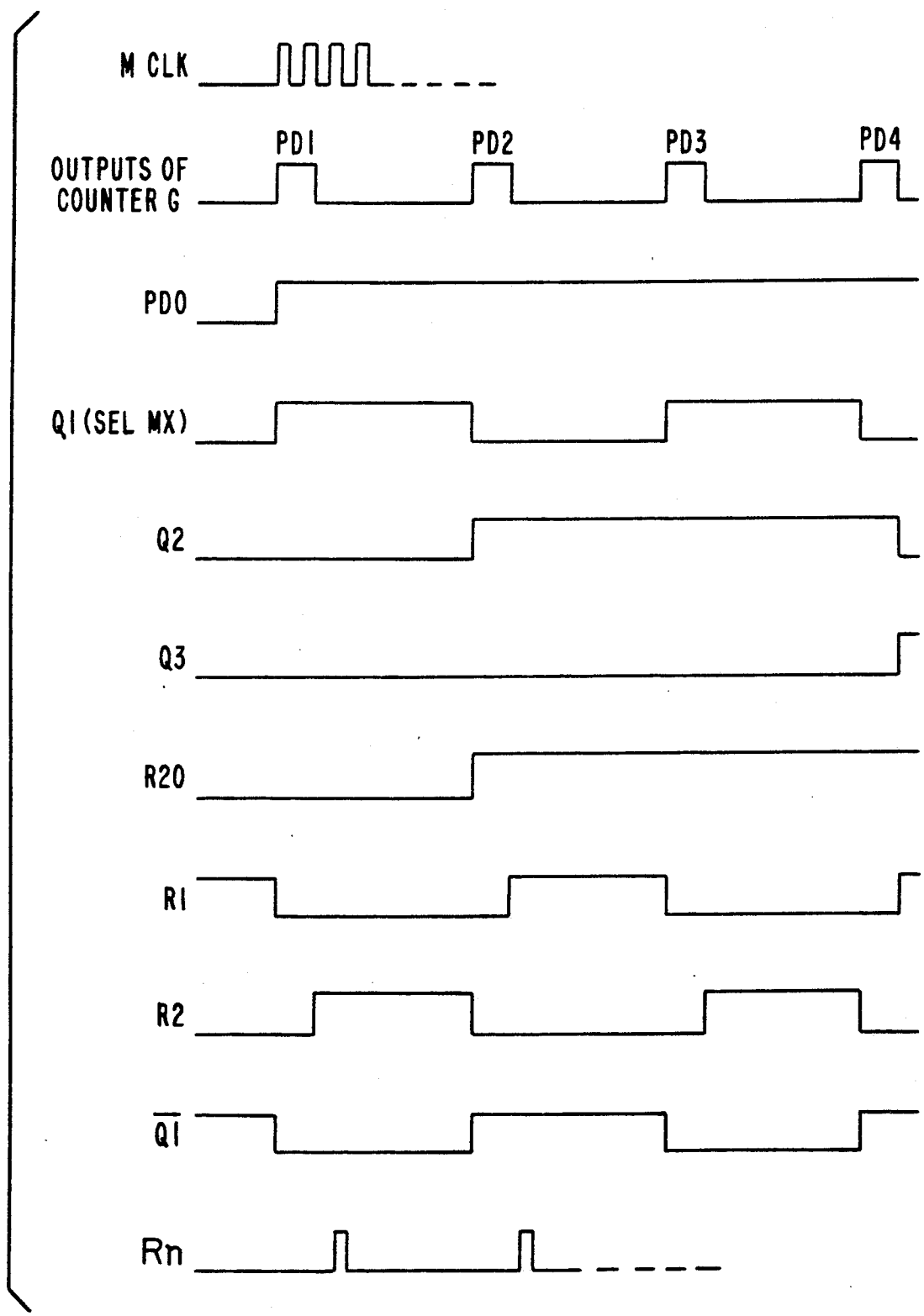
FIG. 7 is a timing diagram showing certain signals used with the read circuit shown in FIG. 1.

Having described, generally, the way in which the peak store clock circuit 38 operates, it seems appropriate to discuss how certain control circuits associated with the circuit 38 are operated. In this regard, FIG. 7 shows certain outputs associated with the counter G shown in FIG. 3B. A peak detect signal coming from the peak detector 36 (FIG. 5) is fed through an inverter 100 into the count terminal of counter G as shown in FIG. 3B. It should be recalled that there may be up to eight peak positions associated with a particular character in E13B font. Some of the peaks, which are numbered PD1-PD8, could be negative peaks as discussed in relation to FIG. 2; however, the negative peaks are converted to positive peaks to be processed by the circuit 38. The absolute values of the negative peaks are stored in the registers (not shown) which are similar to registers DR-1 through DR-8 shown in FIG. 6 for use in the recognition logic 40.

The outputs of counter G are conventionally wired with a plurality of OR gates 102 and 104, NOR gates 106 and 108, and an inverter 110, as shown in FIG. 3B, to produce several of the signals shown in FIG. 7. Counter G counts up through eight and is reset by the master reset signal MR. A point to be stressed here is that although the outputs of counter G are shown as occurring at regular intervals, this is not necessarily the true situation. For example, the waveform 26 shown in FIG. 2 has peak 42 occurring shortly after peak 28; however, there is a considerable time lapse between peak 42 and peak 100. For a correlation, peaks 28, 42, and 100 in FIG. 2 correspond to outputs PD1, PD2, and PD3 shown in FIG. 7. Notice from FIG. 7 that the PDO signal goes to a high level after the first peak detect pulse PD 1 and stays at that level for the rest of a character reading cycle. This PDO signal is used to enable the E counter (via AND gate 80), shown in FIG. 4B, after the first PD pulse, and it is also used to enable the C counter (via AND gate 112), shown in FIG. 4A; these counters come into play after counter A is used for the first positive-going pulse as previously described. The R20 signal from the counter G (FIG. 3B) changes to a high level after the second peak detect signal (PD2 shown in FIG. 7) and stays at the high level for the remainder of the character reading cycle; this feature is used to condition the multiplexer 88 (FIG. 4A) (via the associated AND gate 114) to become operative after the first positive-going peak is detected. The R20 signal is also used to disable the counter A which is used only in association with the first positive-going peak as previously described.

Some additional comments about the various signals shown in FIG. 7 appear necessary. The first output Q1 from counter G (FIG. 3B) is used to obtain the signal R1 via the NOR gate 106 shown in FIG. 3B. The R1 signal is used to enable the counter B shown in FIG. 4A. The first output Q1 from the counter G is also used to obtain the signal R2 via the inverter 110 and the NOR gate 108 (FIG. 3B). The R2 signal is used to enable the counter D shown in FIG. 4B. Notice from FIG. 7 that when signal R1 is low or active, signal R2 is inactive or high. It should be recalled that the counters B and D are used, alternatively, to store counts thereon as previously described. Notice from FIG. 7 that between the signals PD1 and PD2, the signal R1 is low or active; this means that the counter B is enabled, and because the signal Q1 is high at this time, the AND gate 116 (FIG.

4A) permits the M clock pulses to be counted by the counter B.

It would appear useful to review the operation of the read circuit 24. It should be recalled that the counter A is used in conjunction with counter E to obtain the P=Q signal from the output of comparator 90; this process starts after the first positive-going peak 28 occurs. After the first peak 28, the count which was on counter A remains thereon, and a count at the M clock rate begins to accrue on counter B; the counter C is conditioned to count by the PDO signal. Assume that no peak occurs where a peak might be located in the second position for a character; this is analogous to no peak occurring where peak 42 occurs in FIG. 2. In this situation, the count which still exists on counter A is used as a count for a nominal clocking period; suppose that this count is ten. As previously described, the counter E counts upwardly from a reset position or state. When the count on counter E reaches ten, the comparator 90 (FIG. 4B) issues a P=Q signal which is used to reset the counter E (via OR gate 118 and AND gate 120), and this P=Q signal is also fed into the counter C in FIG. 4A. This P=Q signal also becomes CL-1. Notice that at this time, counter B has a count of ten thereon, and counter C has a count of one thereon. If this same situation is repeated and no peak is found where a second peak might be found, the same count of ten which is on counter A is fed into the comparator 90. Similarly, when the count on counter E reaches ten, the comparator 90 will issue another P=Q signal which is added to the number on counter C and which signal is used to reset the counter E. The P=Q signal becomes the clock CL-2. To review here, the counter B has a count of 20 thereon, and the counter C has a count of two thereon. Again, because no actual peak was detected in the example described, the count of ten on counter A is again used to look for an anticipated peak. As a correlation with FIG. 7, the first positive-going peak (PD1) has been detected; however, the second peak (PD2) has not been encountered, yet, in the example being described. Assume that while counter E is again counting up towards ten, a second peak is encountered; this is actually the first peak after the first peak 28 (FIG. 2) is encountered. This second peak signal, corresponding to peak PD2 in FIG. 7, is fed into the counter G (FIG. 3B) causing the output Q2 of counter G to rise to a high level. When Q2 of counter G goes to a high level, Q1 thereof goes to a low level as seen in FIG. 7, and Q1/ (read as Q1 Bar) goes to a high level. This means that counter B is disabled and counter D is enabled. Now, counter D will start to accrue a count thereon through the AND gate 117, and the count which is on counter B will be used for determining the nominal period in looking for the next peak to be encountered.

Continuing with the example being discussed in the previous paragraph, if the actual peak (like PD2 in FIG. 7) occurs before the count of ten occurs on counter E (using a count of ten from counter A as the nominal count), it means that the count on counter B may be 27, for example, in the example being discussed. This means that the document 12 is moving at a speed which is faster than the nominal speed represented by a count of ten on counter A. Notice that the count on counter B is updated or determined by the actual peak, which, in this case, is peak PD2. After the peak PD2 has been detected, the counts which appear on counters B and C are used to obtain the nominal count for use in obtaining the next nominal search period. In this regard, the count of 27 which appears on counter B and the count of 3 which appears on the counter C are fed into the divide-by circuit 84 in FIG. 4A to produce a count of nine which is fed into the A1–D1 contacts of the multiplexer 88. This means that the count of nine, which is an average of three cycles or three nominal periods, will be used as an updated nominal period or adjusted count in looking for the next peak after peak PD2 has occurred.

After the second peak, like PD2, is detected in the example discussed in the previous paragraph, the multiplexer 88 (FIG. 4A) is conditioned to use the count of nine derived from counters B and C in the following manner. The multiplexer 88 is conditioned to operate only after the R20 signal (FIG. 7) goes to a high level; this occurs after the second peak PD2 is detected. The AND gate 114 in FIG. 4A is conditioned by the R20 signal until a master reset (MR) occurs which reset causes the R20 signal to fall to a low level. A high level signal from the OR gate 122 conditions the multiplexer 88 via its G2 terminal. When the second peak PD2 is detected, Q1 (FIG. 7) falls to a low level as previously described. Signal Q1 is also the select signal (SEL MX) for the multiplexer 88. With the SEL MX signal at a low level at the terminal G1 of the multiplexer 88, the inputs A1–D1 thereof are selected to appear on the output terminals QA–QD thereof. It should be recalled that after the second peak is detected, the nominal count derived from counters B and C is used; in the example being described, this count is nine. However, although the count of nine will be used for the next cycle, the count of ten from counter A is still used as the nominal period for this cycle being discussed. Therefore, when the count on counter E reaches ten, a P=Q signal will be issued from comparator 90, and this signal becomes the clock CL-3.

After the second peak is detected, the count of nine from the multiplexer 88 is fed through the OR gates 96 (FIG. 4B) to the comparator 90. Now, this count of nine from the counters B and C is used instead of the count from counter A. When the count on counter E reaches nine, a P=Q signal from the comparator 90 will be generated. From the example which is being discussed in the previous paragraphs, this P=Q signal is actually the fourth clock or CL-4. This fourth P=Q signal is recorded on counter J and it is also forwarded to counter C which was reset to zero by the Rn signal which is delayed slightly with respect to the associated peaks PD1, PD2, etc. as shown by the associated circuitry in FIG. 3B. If no actual peak was detected prior to the count of nine from counter B being matched by the count of nine by the counter E, it means that the count on counter D will be nine, and the count on counter C will be one. Because no peak was detected, the count of nine from counter B will again be used as the nominal period. Suppose at this cycle, no actual peak is detected until after the counter E reaches its count of nine, initiating clock CL-5. During this time, the counter D will continue to count and may actually have a count of 20 thereon due to the document slowing slightly. The count on the counter C is two in the example being described. Again, when the third peak is detected, the Q1/ signal will fall to a low level, and conversely the Q1 signal will rise to a high level as shown in FIG. 7 to disable counter D with the count of 20 thereon and to enable counter B which has been reset. Hereafter, the count of 20 on counter D and the count of 2 on counter C will be fed into the divide-by circuit 86 to arrive at a count of ten which is fed into the A2-D2 terminals of the multiplexer 88 where it will be used for the next nominal cycle as previously explained. In the example described, when the third peak occurs, the SEL MX signal goes to a high level as shown in FIG. 7. A high level input to terminal G1 of the multiplexer 88 conditions it to select the data on terminals A2-D2 thereof. This means that an adjusted nominal count of ten from the counter D will be fed into the comparator 90 for use with counter E as previously described.

Notice, in the example described, that peak PD2 occurred slightly before the third clock CL-3 and that peak PD3 occurred slightly after the fifth clock CL-5. Notice, also, from FIG. 6 that each one of the clocks CL-1 through CL-7 is fed into an associated one shot, like 124-1 and 124-7, for example, which are conventionally wired to produce a delay of about 30% with regard to an examining window mentioned earlier herein. An examining window is equivalent to the time equivalent of the nominal counts on counters A, B, and D. If an actual peak occurs before an anticipated peak, like peak PD2 occurring before clock CL-3, the magnitude data about that peak already is present on the character data or peak value lines 72–78 shown in FIG. 6. When the clock CL-3 does occur, it passes through the associated one shot (not shown but similar to 124-1) and the associated AND gate, like 126-1, to clock the data on the lines 72–78 into the associated storage register DR-3 (not shown but similar to DR-2). When the actual peak occurs after the anticipated peak, as in the situation of peak PD3 occurring after the fifth clock CL-5, it was possible that the clock might not be present when the peak data for peak PD-3 appeared on the lines 72–78. To avoid this possibility, the one shots 124-1 through 124-7 have been added to provide a delay to wait for the data to appear if, in fact, it is present near the associated clock. The PDO signal is used to condition the AND gates 126-1 through 126-7 only after the first peak, like peak 28 in FIG. 2, is detected.

In the example described in the previous paragraph, there was no peak data associated with the clocks CL-1, CL-2, and CL-4; accordingly, the values on the lines 72-78 in FIG. would be close to zero, and the registers OR-1, DR-2, and DR-4 would have zero in them. Because there was a peak before clock CL-3, the peak value associated with peak PD-2 would be clocked into the data register DR-3. When the reading of a character is complete as described herein, the data which is present in the data registers DR-1 through DR-8 is forwarded to the process recognition logic 40 (FIG. 5) where the character is recognized, conventionally.

Some miscellaneous points about the clock circuit 38 (FIG. 5) appear to be in order. The Rn signal, which is fed into the counter C in FIG. 4A, provides a slight delay in resetting this counter to enable the data thereon to be fed into the divide circuits 84 and 86 as previously explained. The Rn signal is derived, conventionally, by the combination of NOR gates 128 (FIG. 3B), 130, and 132, the OR gate 134, the AND gate 136, the counter H the resistor 138, and the capacitor 140. The counter J in FIG. 4B is reset by the inverter 142, the AND gate 144, and the S2 signal coming from the sensor 22-2 shown in FIG. 1. The MR signal passing through a NOR gate 146 (FIG. 4B) is used to reset the decoder 92. The master clock M CLK passes through a NOR gate 148 (FIG. 4B) to condition the comparator 90.

What is claimed is:

1. A character recognition circuit for recognizing MICR characters which have waveforms in which positive peak values, negative peak values, and substantially zero values occur at predetermined clock positions along a said waveform to provide a means for identifying a character; said waveforms always starting with a starting positive peak value; said circuit comprising:

means for generating said waveforms during a character reading process by moving a document with said MICR characters thereon in reading relationship with a MICR reader;

means for converting a said waveform into said positive peak values, negative peak values, and substantially zero values and for placing these values on data lines;

data register means for storing said positive, negative and substantially zero values when clocked therein, a clocking circuit for clocking said positive, negative, and substantially zero values into said data register means while taking into account the speed at which the document on which the MICR characters are located is moving in reading relationship with said MICR reader;

said clocking circuit comprising the first means for determining a nominal clock period represented by a first count;

second means for using said first count afer said starting peak value has occurred to establish nominal clocking pulses in the absence of a said positive or negative peak value for use in clocking the values on said data lines into said data register means; and third means for adjusting said first count in accordance with the occurrence of a first one of said positive or negative peaks reached to provide an adjusted count whereby said second means uses said adjusted count for establishing the next clocking pulse for use in clocking a said value on said data lines into said data register means and whereby said third means adjusts said adjusted count, if necessary, upon the occurrences of subsequent said positive and negative peak values;

said first means including a first counter and speed means for determining the initial velocity of said document moving past said MICR reader by generating said first count which is stored on said first counter, said first means also including a clock for producing clocking pulses.

2. The character recognition circuit as claimed in claim 1 in which said second means includes a second counter which is conditioned to count in an upcounting mode from a reset state by said clock upon the occurrence of said starting positive peak value, and comparing means for comparing the outputs of said first and second counters and also for issuing an equal signal when the output of said second counter equals said first count on said first counter, said equal signal being used to establish one of said nominal clocking pulses.

3. A character recognition circuit for recognizing MICR characters which have waveforms in which positive peak values, negative peak values, and substantially zero values occur at predetermined clock positions along a said waveform to provide a means for identifying a character; said waveforms always starting with a starting positive peak value; said circuit comprising:

means for generating said waveforms during a character reading process by moving a document with said MICR characters thereon in reading relationship with a MICR reader;

means for converting a said waveform into said positive peak values, negative peak values, and substantially zero values and for placing these values on data lines;

data register means for storing said positive, negative and substantially zero values when clocked therein, a clocking circuit for clocking said positive, negative, and substantially zero values into said data register means while taking into account the speed at which the document on which the MICR characters are located is moving in reading relationship with said MICR reader;

said clocking circuit comprising first means for determining a nominal clock period represented by a first count;

second means for using said first count after said starting peak value has occurred to establish nominal clocking pulses in the absence of a said positive or negative peak value for use in clocking the values on said data lines into said data register means; and third means for adjusting said first count in accordance with the occurrence of a first one of said positive or negative peaks reached to provide an adjusted count whereby said second means uses said adjusted count for establishing the next clocking pulse for use in clocking a said value on said data lines into said data register means and whereby said third means adjust said adjusted count, if necessary, upon the occurrences of subsequent said positive and negative peak values;

said first means including a first counter and speed means for determining the initial velocity of said document moving past said MICR reader by generating said first count which is stored on said first counter;

said first means also including a clock for producing clocking pulses;

said second means including a second counter which is conditioned to count in an upcounting mode from a reset state by said clock upon the occurrence of said starting positive peak value, and comparing means for comparing the outputs of said first and second counters and also for issuing an equal signal when the output of said second counter equals said first count on said first counter, said equal signal being used to establish one of said normal clocking pulses;

said third means including third, fourth, and fifth counters, said third counter being conditioned to count in an upcounting mode for a reset state by said clock upon the occurrence of said starting positive peak value with said third counter being disabled upon the occurrence of a first one of said positive or negative peak values to provide a count thereon;

said fourth counter being conditioned to count the number of said equal signals which occur after said starting positive peak value and upon the occurrence of a first one of said positive or negative peak values; and said third means also including a divide circuit for dividing the count on said third counter by the number of equal signals on said fourth counter to provide said adjusted count whereby said second means uses said adjusted count for establishing the next adjusted count.

4. The character recognition circuit as claimed in claim 3 in which said third means also includes a second divide circuit and a multiplexer; said fifth counter being conditioned to count in an upcounting mode from a reset state by said clock upon the occurrence of a second one of said positive or negative peak values, said fifth counter being disabled upon the occurrence of a third one of said positive or negative peaks to leave a count thereon; said count on said fifth counter being divided by the count of equal signals on said fourth counter by said second divide circuit to produce another said adjusted count; said multiplexer being conditioned to forward the adjusted count derived from said third and fourth counters upon the occurrence of said second one of said positive or negative peak values, and also being conditioned to forward the count derived from said fifth and fourth counters upon the occurrence of said third one of said positive or negative peak values.

5. The character recognition circuit as claimed in claim 4 in which said data register means includes a counter for counting the number of equal signals issuing from said comparing means and also includes a decoder for decoding the count on this last named counter into clocks corresponding to said predetermined clock positions; said data register means including a separate register to receive an associated clock corresponding to said predetermined clock positions, with each said data register having an associated delay means for delaying by a predetermined amount of time when a said value on said data lines will be clocked into the associated data register.

* * * * *